Feb. 12, 1924.　　　　　　　　　　　　　　　　　　1,483,616
F. W. J. ROBINSON
SHUTTER FOR THE HEADLIGHTS OF MOTOR CARS, MOTOR CYCLES, AND OTHER VEHICLES
Filed April 23, 1923　　　2 Sheets-Sheet 1

Feb. 12, 1924.  
F. W. J. ROBINSON  
1,483,616  
SHUTTER FOR THE HEADLIGHTS OF MOTOR CARS, MOTOR CYCLES, AND OTHER VEHICLES  
Filed April 23, 1923    2 Sheets-Sheet 2
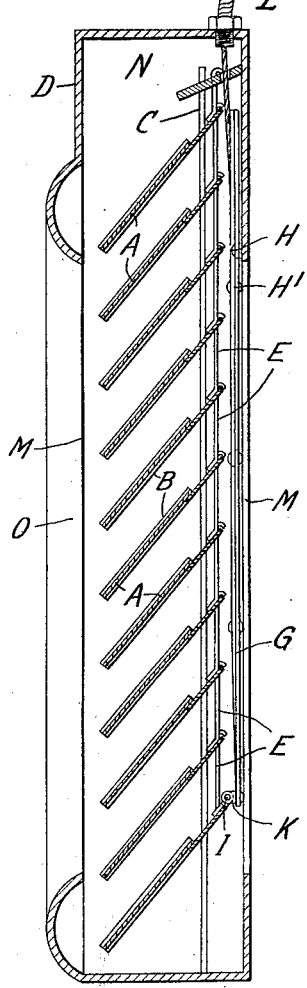
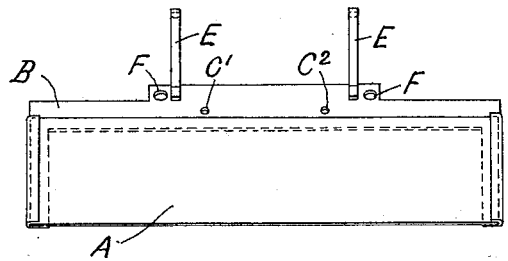
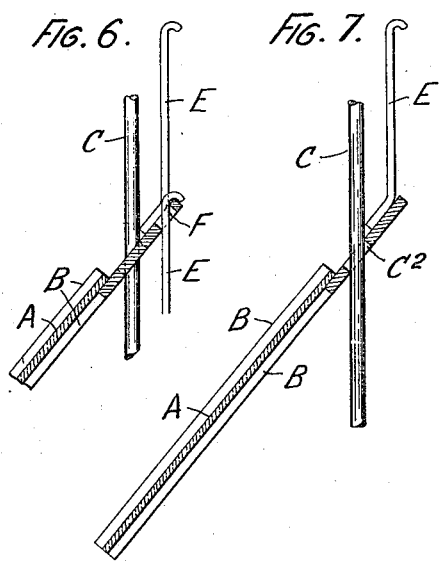
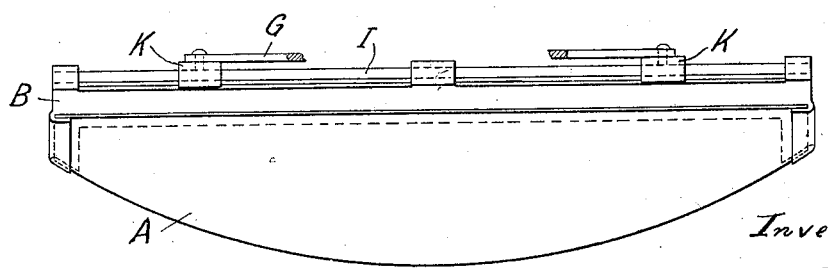

Patented Feb. 12, 1924.

1,483,616

UNITED STATES PATENT OFFICE.

FRANCIS W. J. ROBINSON, OF GERMISTON, TRANSVAAL, SOUTH AFRICA.

SHUTTER FOR THE HEADLIGHTS OF MOTOR CARS, MOTOR CYCLES, AND OTHER VEHICLES.

Application filed April 23, 1923. Serial No. 634,100.

*To all whom it may concern:*

Be it known that I, FRANCIS WILLIAM JAMES ROBINSON, a citizen of the Union of South Africa, residing at 12 Small Street, Germiston, Transvaal, South Africa, have invented a new and useful Shutter for the Headlights of Motor Cars, Motor Cycles, and Other Vehicles, of which the following is a specification.

My invention relates to a new device for dimming and deflecting the illumination of the headlights of motor-cars, motor-cycles and other vehicles, wherein I provide a shutter of the louvered type consisting of a suitable number of blades or leaves of suitable material placed in front of the headlight. This shutter may be drawn down in front of the light, thus deflecting the light in front of and around the front of the vehicle, when in town or approaching other vehicles; or when in open roads the shutter may be drawn up allowing the full illumination of the lamp to be used.

The said shutter is operated by a cable of the ordinary "Bowden" type, in conjunction with a lever placed at any convenient point in the motor-car or other vehicle in which the invention is used.

The said shutter is contained in a holder of shape and size suitable to fit over the front of the headlight.

In order that my invention may be readily understood and carried into practice, reference is hereby made to the accompanying sheet of illustrative drawings, wherein:—

Fig. 3 a central vertical section thereof;

Fig. 4 is a front elevation of one of the leaves or blades comprising the shutter, complete in its metal holder;

Fig. 5 is a plan of the lowermost leaf showing the means of attaching the device for raising and lowering the shutter; and Figs. 6 and 7 are cross sections on an enlarged scale taken at different points of a leaf showing details.

In these drawings like letters of reference indicate corresponding parts wherever occurring in more than one figure.

Figure 1:
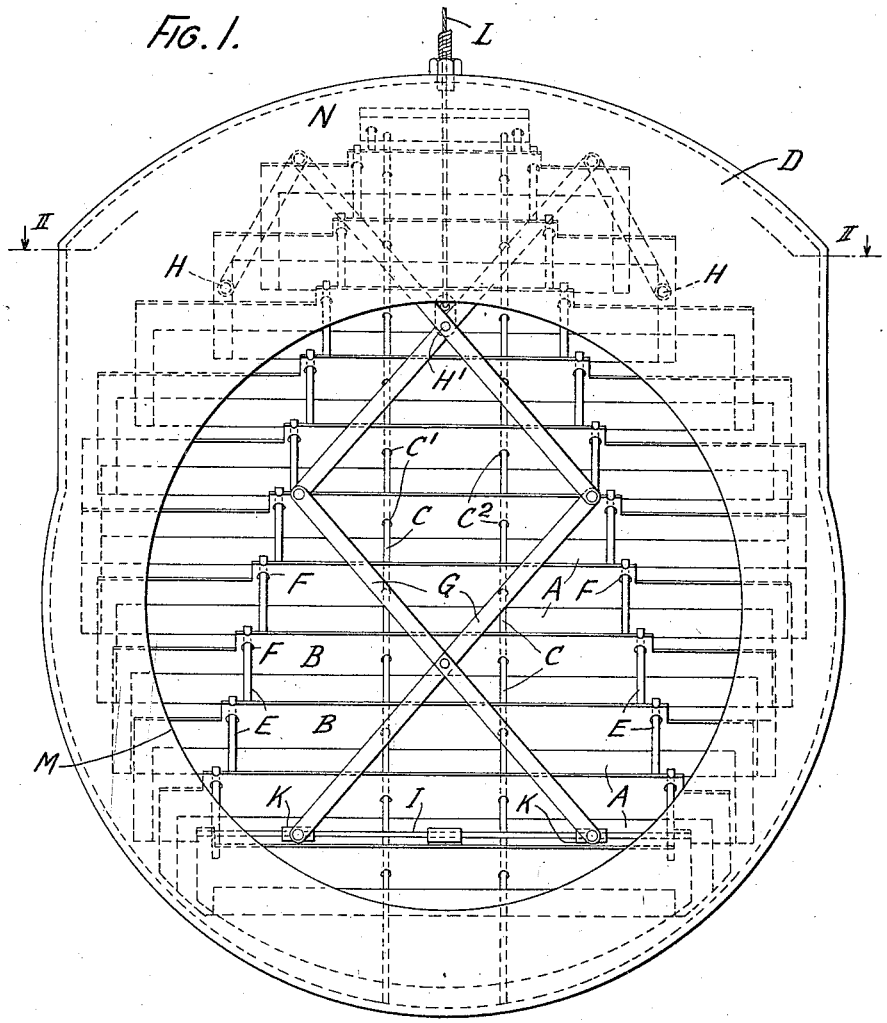
Fig. 1 is a rear elevation of the apparatus.
Figure 2:
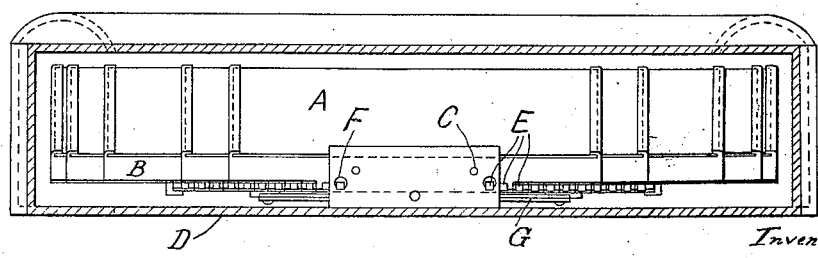
Fig. 2 is a plan view along line II—II of Fig. 1.

Referring to Figs. 1, 2, 3 and 5, A, etc., represents the leaves or blades comprising the shutter. These leaves are made of mica or other suitable substance and are painted or stained blue or some kindred colour, of a transparency sufficient to allow the light to shine through on to the ground about 40 feet or other convenient distance in front of the vehicle, according to the angle at which the lamp is set. A medium suitable for colouring the said leaves as aforesaid is a lacquer as used for colouring electric light globes.

The said leaves or blades, A, are each contained in a metal frame, B, whereof a suitable form is represented (in front elevation) in Fig. 4.

In the said frame of each leaf (or in each leaf itself) are holes at two points, $C_1$ and $C_2$, equidistant from the centre thereof, through which pass two parallel metal bars C suitably attached at both ends to the holder, D, of the shutter. The said leaves comprising the shutter are therefore free to move up and down the two said parallel bars.

The leaves, being strung upon the said parallel bars in the manner hereinbefore described, are set at an angle of about 30° to the said bars (or at an angle such as to prevent the naked light from shining otherwise than on the ground in front of the vehicle). The said angle is set by two small hooked rods E, which are shown most clearly in Figs. 6 and 7, projecting from the frame of each leaf (or from each leaf itself) at an obtuse angle of, say, 150°, or at such other angle as may be convenient, each of the said small rods coinciding approximately in length with the breadth of the leaves or blades. Each of the said rods, further, passes through holes, F, in the frame of the leaf (or in the leaf itself) immediately above, and the leaves thus connected are prevented from becoming disengaged by a small knob at the end of each rod of a size sufficient to prevent it from passing through the holes F. The portion of the leaf or blade immediately above each of the aforesaid small rods is cut away in order to allow the leaves to fold away without fouling, so that all the leaves or blades taken together present a staggered or echelon formation, as will more fully appear from Fig. 1.

By this device the leaves are set at a constant angle, and each one of the said leaves is allowed thereby to come into its proper place without fouling, when drawn up to the top of the holder or when lowered so as to obscure the light.

The said leaves comprising the shutter are raised and lowered by means of a lazy-tongs device, G. The said device is attached to the holder D containing the shutter at the pivoted points H, H, and is attached to the bottom leaf of the shutter, in the manner hereinafter to be described. At the top of the bottom leaf of the shutter a metal rod, I, is suitably attached by its ends, on which are placed two collars, K, so that they are free to slide along the said rod I. The said lazy-tongs device is pivotally connected to the said collars, K. The said lazy-tongs device is extended and contracted by means of the operation of a cable of the ordinary "Bowden" type, whereof the inside wire is suitably connected to the lazy-tongs device at the pivoted point $H_1$, the end of the hollow or outside cable, L, being suitably mounted on the holder of the shutter, as will more clearly appear from Figs. 1 and 3.

By the operation therefore of a lever of the ordinary type at the other end of the said cable, the lazy-tongs device, G, is extended and contracted, and by such extension and contraction the leaves comprising the shutter are lowered and drawn up, so as, respectively, to obscure and to reveal the rays of the lamp.

The holder or case D of a suitable nature to contain the shutter is adapted to fit in front of a motor-car or motor-cycle headlight of the ordinary type, wherein M represents the circular aperture through which the light shines, and N that portion of the holder into which the leaves A are withdrawn by the operation of the apparatus hereinbefore described. In the circular aperture M, a glass, O, is fitted.

I claim:—

1. A shutter for headlights, comprising a vertical set of connected leaves, a horizontal member secured to the upper part of the bottom leaf and provided with a pair of spaced slides, a case or holder wherein the leaves are disposed, a lazy-tongs device within the case for operating said leaves pivotally connected at its lower end to said slides and at its upper end to one wall of said case, and a member connected to the upper portion of the lazy-tongs device to actuate the same; substantially as described.

2. A shutter for headlights, comprising a set of superposed leaves; the upper portions of all of the leaves having pairs of openings which aline with one another throughout the entire set of leaves, and each leaf excepting the bottom one also having a second pair of openings in its upper portion, the last-named pairs of openings being offset relatively to one another; a case or holder wherein the leaves are disposed, a pair of parallel vertical guide rods secured in the case and extending through the first-named pairs of openings, a pair of parallel supports fixed at their lower ends to the upper portion of each leaf and having hooked upper ends which are loosely engaged in the second-named pair of openings in the next higher leaf, and a device connected to operate all of the leaves in unison; substantially as described.

FRANCIS W. J. ROBINSON.

Witnesses:
D. ROBERTSON,
A. MUNDI.